United States Patent Office 3,555,149
Patented Jan. 12, 1971

3,555,149
MUMPS VACCINE AND ITS PREPARATION
Eugene B. Buynak, North Wales, and Maurice R. Hilleman, Lafayette Hills, Pa., assignors to Merck & Co., Inc., Rahway, N.J., a corporation of New Jersey
No Drawing. Continuation-in-part of application Ser. No. 479,653, Aug. 13, 1965. This application July 5, 1968, Ser. No. 742,519
Int. Cl. A61k 27/00
U.S. Cl. 424—89
6 Claims

ABSTRACT OF THE DISCLOSURE

A non-pathogenic but antigenic live mumps virus is produced by multiple serial passage of a virulent virus through embryonated chick eggs and chick embryo tissue culture, the attenuated virus thereby produced being useful in making mumps vaccine.

---

Related case: This application is a continuation-in-part of U.S. Ser. No. 479,653, filed Aug. 13, 1965, now abandoned.

This invention relates to vaccines and particularly to an attenuated, live mumps virus which is to be injected in human beings to protect them against mumps. The invention also includes the development of the attenuated virus strain.

Due to the attenuated nature of the virus, it causes little if any clinical reaction. It does, however, evoke a significant level of antibody against the virus in man and this antibody is essential to protection against the virus and disease.

Mumps, like measles, is usually regarded as one of the minor illnesses of childhood. In the ordinary clinical infection, this is true. In the extraordinary case, however, the clinical consequence of viral infection may be severe and the sequelae may be as devastating as in measles.

In the usual case of mumps, the acute febrile episode follows on an incubation period of 18 to 21 days. The principal clinical manifestations are fever with unilateral or bilateral parotid swelling, sometimes with involvement also of the submaxillary and sublingual glands.

Viremia commonly accompanies mumps virus infection and involvement of a variety of organs or organ systems may take place. This may include the epididymis, prostate, ovary, liver, pancreas, spleen, thyroid, kidneys, labyrinth, eye, thymus, mycardium, mammary glands, and central nervous system. Most prominent disease manifestations are encephalitis, encephalomyelitis, neuritis of facial, trigeminal or optic nerves; aseptic meningitis (0.5–10% of cases); scleritis; pancreatitis sometimes leading to diabetes; and orchitis or ovaritis sometimes leading to atrophy and sterility. Serious complications are least frequent among children. The more serious aspect attends occurrence of the infection in adults who have escaped the illness in childhood.

Uncomplicated mumps in children is debilitating, distressing to parents, and results in sizeable time loss from school. Complicated mumps, either in childhood or in adulthood, may range from mild disease with total apparent recovery to destruction or incapacitation of essential organ systems which may lead to life-long crippling or death.

In general terms, the invention is concerned with the adaptation and propagation of mumps virus in tissue cultures prepared from embryonated hens' eggs. More particularly, this invention is directed to the development of a live attenuated mumps virus vaccine following serial passage in chick embryo tissue culture. This procedure involves the steps: A, the isolation of the virulent virus in any variety of cells in culture or embryonated hens' eggs, and its adaptation to chick embryo tissue culture; B, the development of the attenuated live virus by a plurality of serial passages in chick embryo tissue culture; and C, the preparation of the vaccine from this attenuated live virus. These steps will be separately explained.

(A) Isolation and adaptation of virulent virus

Isolation and adaptation of mumps virus can be accomplished in chick embryo tissue culture using clinical material (e.g., throat swab) or virus previously propagated in embryonated hens' eggs. Incubation of infected cultures can be carried out at 30–34° C. (optimal 32° C.) or at 35–38° C. (optimal 36° C.). Representative isolation procedures are the following:

Procedure 1.—Mumps virus was isolated in embryonated hens' eggs from clinical material, i.e. from persons known to have mumps.

Procedure 2.—Mumps virus was isolated in chick embryo tissue culture from clinical material.

(B) Development of attenuated live mumps virus vaccine

The virus which has been established in A to be mumps virus, is added to glass bottles containing chick embryo tissue cultures prepared from minced and trypsinized approximately ten-day-old chick embryos. The culture medium may be any of those which support cell growth and this may, for example, be the known medium 199 to which calf serum has been added. After the addition of the virus, the infected cell cultures are incubated in successive passages at 30–38° C. for variable time periods during which time the virus is replicated and becomes attenuated. The virus-containing fluids are then harvested and stored frozen or at other low temperature so as to preserve the infectiousness of the agent.

The above serial passages are performed using diluted inoculum and multiple harvests are collected at various intervals. Infectivity titrations are performed in HeLa, grivet monkey kidney tissue or chick embryo tissue cultures.

(C) Preparation of vaccine

The mumps virus harvested after this repeated serial passage was found to be nonpathogenic for monkeys and rodents, to cause little if any clinical reaction in human recipients, and to evoke a significant level of antibody. The virus infectivity is stabilized by a suitable stabilizer such as sucrose, human albumin, glutamine, phosphate or mixtures thereof. After titration to establish its potency, the virus pool is subdivided and filled into ampules for use. The product can be stored and dispensed frozen or preferably dried from the frozen state and kept free of moisture.

Illustrative examples are the following:

EXAMPLE I

The inoculum is that obtained from Procedure 1 described above.

Nine to eleven day-old chick embryos, after removal of the head and extremities, are finely minced under aseptic conditions and the minced tissue washed in several changes of Hanks' BSS. The washed tissue is trypsinized at 36° C. using 0.25% trypsin (Difco 1:250) in tris saline buffer for two to three hours. The trypsin-cell suspension is harvested through two thicknesses of sterile cheese cloth and centrifuged at 1500 r.p.m. for five minutes. Packed cells are resuspended in growth medium for counting. Growth medium consisted of medium 199 (Morgan, J. F., Morton, H. J., and Parker, R. C., Proc. Soc. Exp. Biol. and Med., 73: 1–8, 1950) containing 2% agamma calf serum (heated 56° C.—30 minutes) and 50 mcg./ml. neomycin. Bottle cultures are planted at a concentration of 350,000 viable cells per milliliter. Following incubation at 36° C. for 48 to 72 hours, bottle cultures can be used for serial passage or vaccine preparation.

Chick embryo tissue cultures are prepared in glass bottles using medium 199 containing 2% inactivated calf serum as growth medium. Three to four days post-planting, the growth medium is drawn off aseptically and the bottle cultures are washed four times with Hanks' BSS, 100 milliliters per wash, and inoculated with 2.5 ml. of diluted mumps virus seed per bottle. Seventy milliliters of medium 199 containing 10% of suitable viral infectivity stabilizer is added to each bottle culture and the bottles incubated at 30–34° C. Neomycin at a concentration of 50 mcg./ml. was incorporated in the growth and maintenance medium. Multiple harvests are collected at 2–4 day intervals and the bottle cultures are refed with fresh maintenance medium containing the above-mentioned stabilizer. Ten successive passages are performed, all at the approximate temperature of 32° C. Infectivity titrations of each harvest are performed in HeLa or grivet monkey kidney tissue cultures. Each harvest is collected aseptically into a sterile container, samples are removed for microbial sterility testing and the remainder is shell frozen in a Dry Ice-alcohol bath. The virus-containing fluids are stored at −70° C. in an electrically operated freezing unit prior to selection of a harvest or harvests for preparation of the vaccine.

Appropriate harvest or harvests are selected following completion of infectivity titrations. The selected material is removed from the freezer and thawed. A sample is removed for control and safety testing. The remaining fluid is clarified and a sample removed for monkey safety testing. Appropriate additional stabilizer is added to the remaining fluid. The fluids are distributed into individual vials and dried. Following the drying procedure, the vials are capped, sealed and retained for reconstitution as a vaccine by the addition of sterile water.

Tests in man.—Approximately 150 children without prior history of mumps infection received a dose of attenuated mumps virus vaccine by the parenteral route. Essentially all the children responded with a significant antibody titer within a month after vaccination. The children developed little, if any, clinical manifestations depending on the strain of mumps virus and the passage level in embryonated hens' eggs and/or chick embryo tissue culture.

EXAMPLE II

The procedure of Example I is carried out but the incubation of the mumps virus is in the 35–38° C. range and close to 36° C.

EXAMPLE III

The procedure of Example I is carried out but using the mumps virus seed of Procedure 2.

More or fewer successive passages of the virus in the chick embryo tissue culture can be made to attenuate the virus. Also, this may be preceded by serial passages through embryonated hens' eggs. This is illustrated by the following examples in which:

EAM represents embryonated hens' eggs, employing conventional procedures,
CET represents chick embryo tissue culture.

EXAMPLE IV

3 EAM at 30–38° C.+1 CET at 30–38° C.

EXAMPLE V

10 EAM at 30–38° C.+10 CET at 30–38° C.

EXAMPLE VI

10 EAM at 30–38° C.+2 CET at 30–38° C.

EXAMPLE VII

15 EAM at 30–38° C.+2 CET at 30–38° C.

EXAMPLE VIII

20 EAM at 30–38° C.+2 CET at 30–38° C.

EXAMPLE IX

Direct isolation in CET at 30–38° C.+1 CET at 30–34° C.

EXAMPLE X

Direct isolation in CET at 30–38° C.+10 CET at 30–34° C.

EXAMPLE XI

Direct isolation in CET at 30–38° C.+1 CET at 35–38° C.

EXAMPLE XII

Direct isolation in CET at 30–38° C.+10 CET at 35–38° C.

The invention has been described with particular reference to ten serial passages through CET to assure attenuation of the virus, but it is to be understood that a fewer number may suffice. Thus, the invention contemplates a single incubation in CET to achieve the desideratum of a virus which will evoke a mumps antibody response in humans with a reduction in the otherwise severe symptoms of the disease. Successive passages after the first growth in CET can be expected to result in increased attenuation.

What is claimed is:
1. A mumps vaccine comprising
  (A) as its essential ingredient, immunologically effective amount of an attenuated mumps virus characterized by
    (a) when injected in monkeys, showing no pathogenic effects;
    (b) when injected into humans
      (i) being free of clinical manifestations of the disease, and
      (ii) evoking in man an antibody response to a virulent virus;
    (c) being capable of inducing its own replication in living cells; and
    (d) having been attenuated from virulent mumps virus by at least 10 passages in embryonic hens' eggs at 30–38° C. followed by replication in chick embryo tissue at 30–38° C.; and
  (B) a stabilizer.

2. A vaccine of claim 1 in which the said stabilizer is one or more of the group consisting of sucrose, albumin and glutamine phosphate.

3. A dried mumps vaccine composition which comprises
  (A) an immunologically effective amount of an attenuated mumps virus characterized by
    (a) when injected in monkeys, showing no pathogenic effects
    (b) when injected in humans,
      (i) being free of clinical manifestations of the disease, and
      (ii) evoking in man an antibody response to a virulent virus;
    (c) being capable of inducing its own replication in living cells; and
    (d) having been attenuated from virulent mumps virus by at least 10 passages in embryonic hens' eggs at 30–38° C. followed by replication in chick embryo tissue at 30–38° C.; and
  (B) a stabilizer, there being sufficient of said stabilizer that the addition of enough sterile water to said dried composition to form an immunologically effective injectable vaccine will form about 10% solution of said stabilizer.

4. A composition of claim 3 in which the stabilizer is one or more of the group consisting of sugar, albumin, and glutamin phosphate.

5. The process of preparing a live mumps virus useful as an antigen in a vaccine which will evoke in man an antibody response against a virulent mumps virus without causing the severe clinical manifestations of the disease which comprises growing the virus by at least ten successive passages in embryonated hens eggs followed by propagation in chick embryo tissue culture 30–38° C. containing tissue of 9 to 11 days old chick embryo.

6. The method of obtaining an attenuated mumps virus characterized by
   (a) when injected into monkey tissue, showing no pathogenic effects,
   (b) when injected into humans,
      (i) being free of clinical manifestations of the disease, and
      (ii) evoking in man an antibody response to a virulent virus.
   (c) being capable of inducing its own replication in living cells which comprises the steps of
      (1) serially replicating a virulent mumps virus through at least ten passages in embryonic hens' eggs at 30–38° C. and
      (2) then replicating at 30–38° C. in chick embryo tissue the virus obtained from said serial passages.

References Cited

UNITED STATES PATENTS 3,014,843  12/1961  Baker _____ 424—89
3,186,908   6/1965  Rightsel et al. _____ 424—89

OTHER REFERENCES

Klyatchko et al., Acta Virologica (English Edition), vol. 2, pp. 145–151, 1958.

Smorodintsev et al. (1), Acta Virologica (English Edition), vol. 2, pp. 137–144, 1958.

Smorodintsev et al. (2), Acta Virologica, vol. 9, pp. 240–247, May 1965.

RICHARD L. HUFF, Primary Examiner

U.S. Cl. X.R.

195—1.3